United States Patent [19]

Saint et al.

[11] 4,357,735

[45] Nov. 9, 1982

[54] BALL AND SOCKET SAFETY HINGE

[75] Inventors: David Saint, Elverson; James Eldon, III, Barto; Thomas L. Latone, Quakertown, all of Pa.

[73] Assignee: Graco Metal Products, Inc., Elverson, Pa.

[21] Appl. No.: 270,768

[22] Filed: Jun. 5, 1981

[51] Int. Cl.³ .................................. E05D 5/08
[52] U.S. Cl. ................................ 16/224; 403/117; 5/99 B
[58] Field of Search .............. 5/99 B, 99 R, 93, 98 R, 5/99 A, 110, 111, 114, 127; 403/113, 114, 115, 117, 161; 16/224, 250, 375, 376

[56] References Cited

U.S. PATENT DOCUMENTS

| | | | |
|---|---|---|---|
| 2,735,251 | 2/1956 | Dlugosch | 403/113 X |
| 3,414,294 | 12/1968 | Moulton | 16/224 |
| 3,999,229 | 12/1976 | Wyss | 5/99 A |
| 4,069,524 | 1/1978 | Carlo | 5/99 B |

Primary Examiner—Werner H. Schroeder
Assistant Examiner—Andrew M. Falik
Attorney, Agent, or Firm—Seidel, Gonda, Goldhammer & Panitch

[57] ABSTRACT

A cover at one end of a rod member is pivotably connected to one end of a bracket by a pin. The bracket and cover are U-shaped in transverse section. A portion of the cover overlies a portion of the bracket in all positions of the cover. The cover is journaled on bosses on the bracket and circumscribes the pin.

10 Claims, 5 Drawing Figures

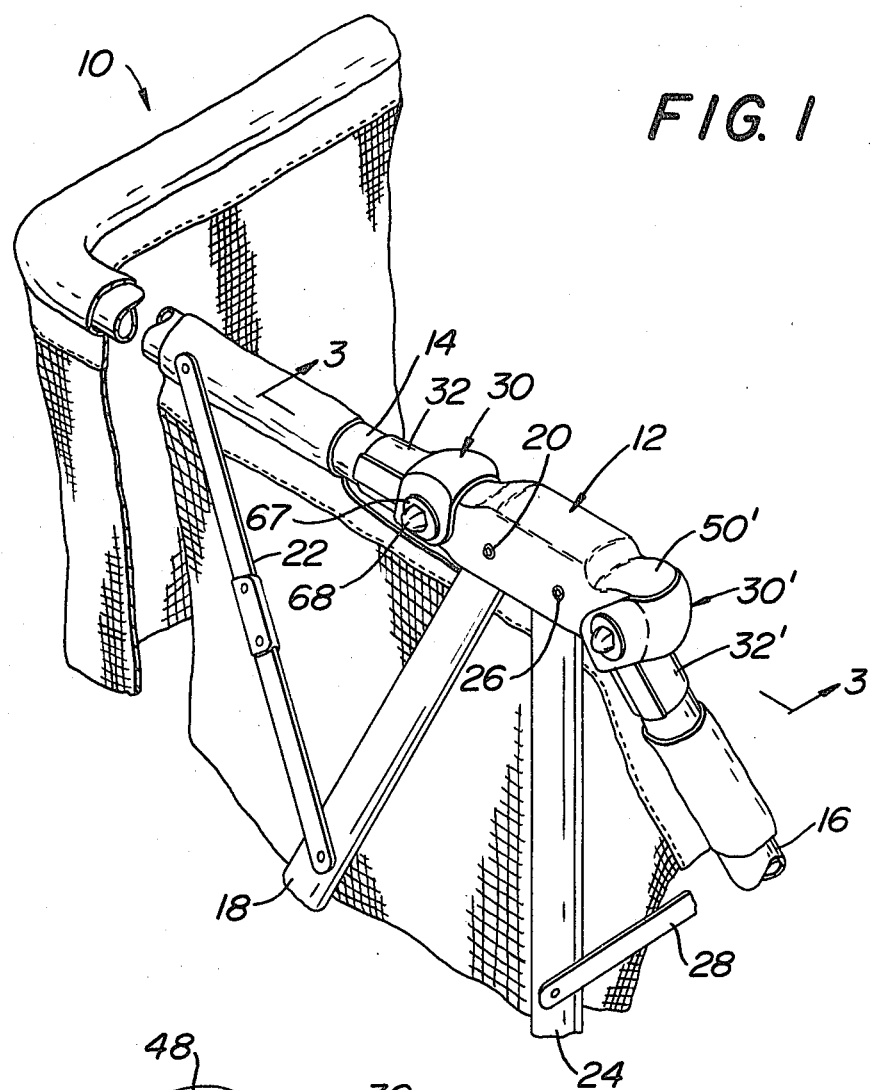
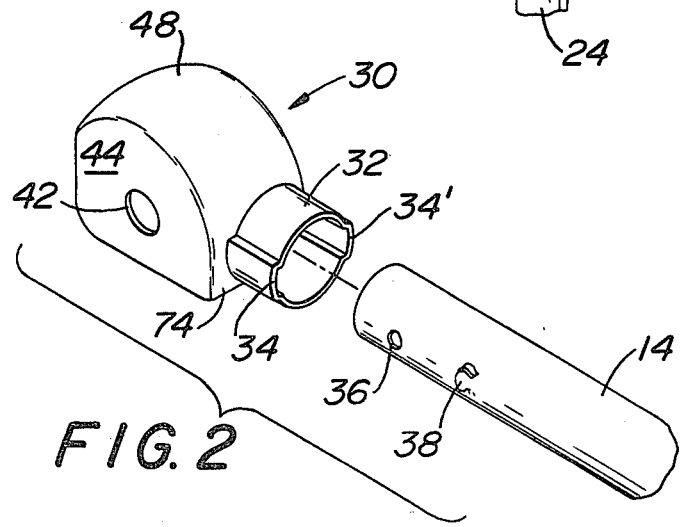

BALL AND SOCKET SAFETY HINGE

BACKGROUND

On many collapsible devices, there is a need for a safety hinge which is constructed in a manner so that one's fingers will not be pinched as the hinge portions pivot relative to one another. Hinges of the general type involved herein are known in connection with collapsible devices such as a child's playpen. See U.S. Pat. No. 4,069,524.

Hinges of the type disclosed in said patent have several disadvantages. One disadvantage is that excess plastic material is utilized due to a use of a generally spherical ball having flats on opposite sides. Another disadvantage of the hinge in said patent results from the ball member and bracket member each being in direct contact with a transverse pivot pin which will ultimately result in excess wear on the ball member as it pivots relative to the bracket. Another disadvantage of said patent is that the pivot pin is used to secure the rod member to the ball member whereby desirable preassembly of components is not possible.

The safety hinge of the present invention is directed to a solution of the problems and disadvantages associated with the prior art.

SUMMARY OF THE INVENTION

The safety hinge of the present invention is designed to obviate pinching of fingers when pivoting a rod member relative to a bracket. The rod member has one end pivoted to one end of the bracket by a pin means. The rod member has a cover at said one end thereof. The bracket and cover are each U-shaped in transvere section at the pivot means. A portion of the cover overlies a portion of the one end of the bracket in all positions of the cover. The cover is journaled on bosses on the bracket. The bosses circumscribe a portion of the pin means.

It is an object of the present invention to provide a safety hinge which is simple, inexpensive, and reliable.

It is another object of the present invention to provide a safety hinge which facilitates assembly with preassembled components.

It is another object of the present invention to provide a safety hinge wherein there is minimal wear on the components pivoted together.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 1 is a partial perspective view of the collapsible device such as a child's playpen and incorporating the safety hinge of the present invention.

FIG. 2 is an exploded partial perspective view of a rod member and its associated cover.

DETAILED DESCRIPTION

Figure 3:
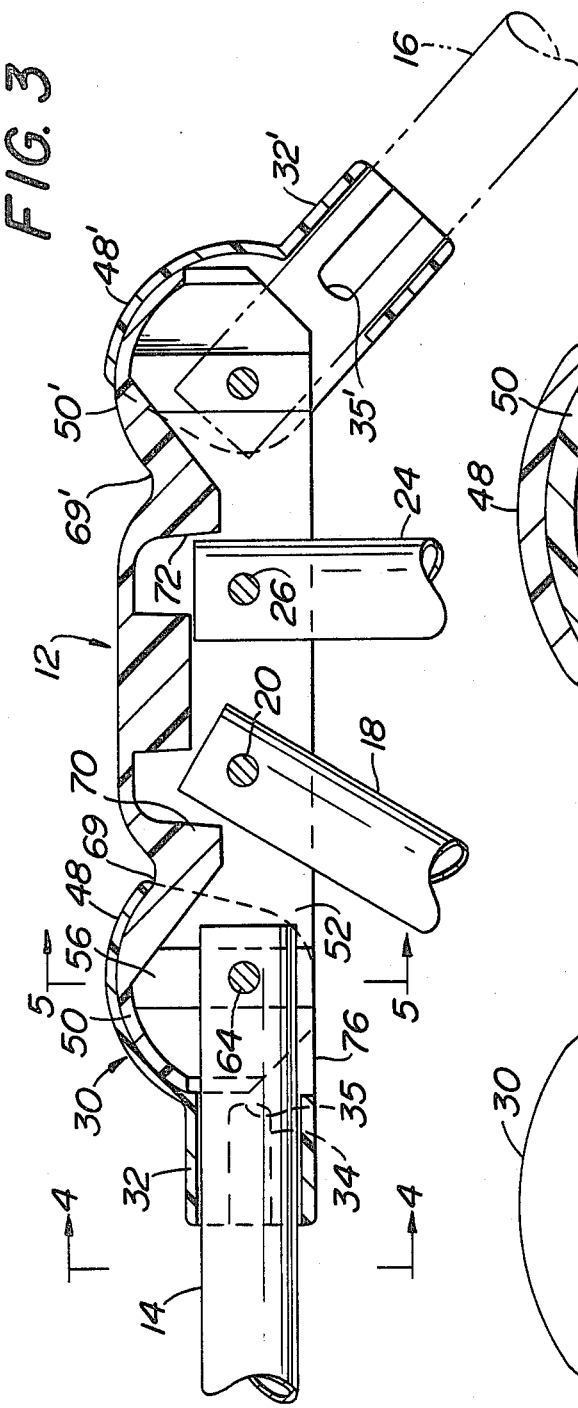
FIG. 3 is a sectional view taken along the line 3—3 in FIG. 1.

Referring to the drawing in detail, wherein like numerals indicate like elements, there is shown in FIG. 1 a partially collapsed playpen designated generally as 10. The playpen per se forms no part of the present invention. The playpen 10 includes a safety hinge which includes a bracket 12 pivotably connected at one end to a hollow metal rod member 14 and pivotably connected at the other end to a hollow metal rod member 16. Such pivotable connections are identical. Hence, only the pivotable connection between bracket 12 and rod member 14 will be described in detail with corresponding primed numerals being provided in connection with the rod member 16.

Intermediate its ends, the bracket 12 is pivotably connected by pin 20 to one end of a strut 18. The strut 18 is pivotably connected to one end of a collapsible hinge 22. The other end of the hinge 22 is pivotably connected to the rod member 14. Intermediate its ends the bracket 12 is also pivotably connected by pin 26 to one end of a strut 24. Strut 24 is pivotably connected to one end of a collapsible hinge 28. The other end of the collapsible hinge 28 is not shown but is connected to the rod member 16 in the same manner described above.

One end of the rod member 14 is provided with a cover 30. See FIGS. 2 and 3. Cover 30 has a sleeve 32 connected thereto. Sleeve 32 is open at both ends. On opposite sides of the sleeve 32, there is provided channels 34, 34'.

At a predetermined location spaced from the end of rod member 14, it is transversely pierced. The piercing of rod member 14 results in a tab 40 on the inner surface of the rod member 14 and a tab 38 projecting from one side. Tab 38 is at a predetermined location so that when the sleeve 32 is telescoped over one end of rod member 14, the tab 38 will abut the end 35 of channel 34. This will automatically place transverse hole 36 coaxial with holes 42 in the side walls 44, 46 of the cover 30. Cover 30 has an arcuate top wall 48. Thus, a cover 30 may be preassembled to one end of the rod member 14 with certainty of alignment and coaxiality of holes 36, 42. There is no tab that enters the channel 34'. However, by having a pair of channels 34, 34', operators need not concern themselves as to where the tab 38 is located since tab 38 can enter either one of the channels. Also, cover 30 may be used with either member 14 or 16.

The cover 30 has an arcuate top wall 48 and is U-shaped in transverse section at the location of the holes 42. The bracket 12 is provided with an arcuate top wall 50 and oppositely disposed side walls 52, 54. Hence, the end portion of the bracket 12 is also U-shaped in section. See FIG. 5. The width of bracket 12 at its end portions is narrower than the width of the middle portion by an amount corresponding to the thickness of walls 44, 46.

Figure 5:
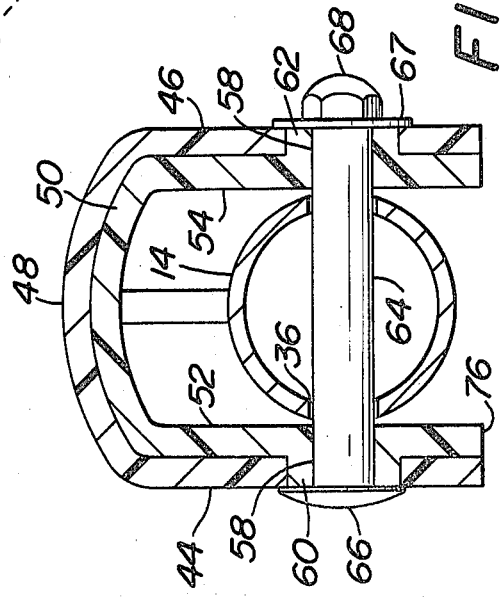
FIG. 5 is a sectional view taken along the line 5—5 in FIG. 3.
Figure 4:
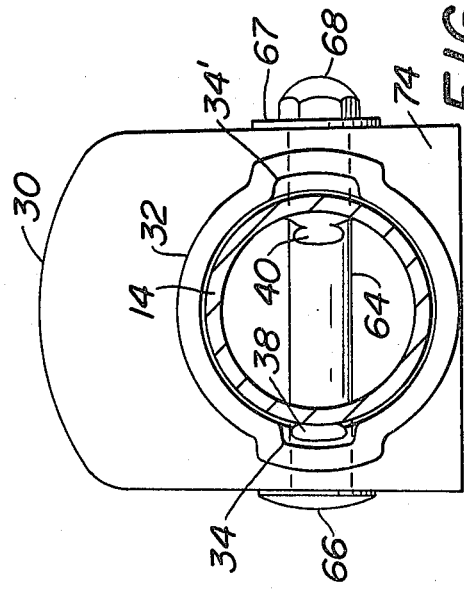
FIG. 4 is a sectional view taken along the line 4—4 in FIG. 3.

As shown more clearly in FIG. 3, the opposite side walls of the end portion of bracket 12 have a reinforced section 56 of greater thickness. In the sections 56, the side walls 52, 54 have aligned holes 58. Coaxial with hole 58 on side wall 52, there is provided an outwardly extending boss 60. The side wall 54 is provided with a similar boss 62. A pin 64 extends through the holes 58 and the hole 36 in the rod member 14. The holes 42 in the side walls of the cover 30 are journaled on the bosses 60, 62 as shown in FIG. 5. The side walls 44, 46 are sufficiently flexible so as to enable the side walls to be snapped over the bosses while the arcuate portions 48 and 50 are in sliding contact. Since the cover 30 does not rotate on the pin 64, there is less wear.

The pin 64 has an enlarged flatened head 66 which overlies the boss 60 and the hole 42 in the side wall 44 of the cover 30. At the opposite end of the pin 64, there is provided a washer 67 which overlies the boss 62 and the hole in wall 46. A removable retainer 68 which may be threaded or of the snap on type is attached to the free end of pin 64.

Referring to FIG. 3, the central portion of the bracket 12 includes a shoulder 70 which acts as a limit stop for one position of the strut 18. The central portion of bracket 12 is also provided with a limit stop 72 to define one position of the strut 24. The top walls 48 and 50 are arcuate in a longitudinal direction for 90° about the axis of pin 64 as shown more clearly in FIG. 3 in addition to being arcuate transversely as shown in FIG. 5. Cover 30 is shown at the lefthand end in FIG. 3 in one extreme position wherein the rod member 14 is horizontally disposed. At the righthand end of FIG. 3, the rod member 16 is at a angular disposition intermediate the ends of its pivotable movement.

The extent of pivotable movement for the rod members 14 and 16 is 90°. If rod member 14 is rotated counterclockwise in FIG. 3 through an arc of 90°, the rear wall 74 contacts the lower edge 76 on the bracket 12 to act as a limit stop. When rod member 14 is in the position as shown in FIG. 3, wall 74 and edge 76 are mutually perpendicular. The neck area 69 on bracket 12 acts as a limit stop for cover 30 so that members 14 and 16 will be coaxial and horizontal at one end of their range of pivotable movement.

The limit stops 70 and 72 prevent the struts 18 and 24 respectively from pivoting more than 90° with respect to the bracket 12. The struts 18 and 24 in normal usage will constitute limit stops for the rod members 14 and 16 depending upon their position. In any event, the arcuate top wall 48 overlies the arcuate top wall 50 in all rotative positions of the rod members 14 and 16. In all positions of the arcuate top wall 48, there are no surfaces which a person's fingers may enter and get pinched due to the sliding relationship between the arcuate top walls 48, 50. The covers 30, 30' and the bracket 12 are preferably made from a polymeric plastic material such as high density polyethylene.

The present invention may be embodied in other specific forms without departing from the spirit or essential attributes thereof and, accordingly, reference should be made to the appended claims, rather than to the foregoing specification, as indicating the scope of the invention.

We claim:

1. A safety hinge to obviate pinching of fingers comprising a bracket, a rod member having one end directly pivoted to one end of the bracket by a transverse pin, the rod member having a cover at said one end, the bracket and cover being U-shaped in transverse section at said pin, a portion of the cover overlying a portion of said one end of the bracket in all positions of the cover, said cover being journaled on bosses on said bracket, the bosses circumscribing a portion of the pin.

2. A safety hinge to obviate pinching of fingers comprising a bracket, a rod member having one end pivoted to one end of the bracket by a pin means, the rod member having a cover at said one end, the bracket and cover being U-shaped in transverse section at said pivot means, a portion of the cover overlying a portion of said one end of the bracket in all positions of the cover, said cover being journaled on bosses on said bracket, the bosses circumscribing a portion of the pin means, said cover and said one end of said bracket are arcuate in longitudinal section about the axis of the pin means and are in sliding contact with one another.

3. A safety hinge in accordance with claim 2 wherein said bracket and cover are made from a polymeric plastic, said rod member being metallic and hollow.

4. A safety hinge in accordance with claim 1 wherein said cover has a sleeve telescoped over said one end of said rod member, cooperating limit stops on said rod member and sleeve to define the length to which the cover may telescope over the rod member.

5. A safety hinge to obviate pinching of fingers comprising a bracket, a rod member having one end pivoted to one end of the bracket by a pin means, the rod member having a cover at said one end, the bracket and cover being U-shaped in transverse section of said pivot means, a portion of the cover overlying a portion of said one end of the bracket in all positions of the cover, said cover being journaled on bosses on said bracket, the bosses circumscribing a portion of the pin means, said cover having a sleeve telescoped over said one end of said rod member, cooperating limit stops on said rod member and sleeve to define the length to which the cover may telescope over the rod member, said limit stops include a tab integral at one end with the rod member and a longitudinally extending channel on the sleeve, said tab extending into said channel.

6. A safety hinge to obviate pinching of fingers comprising a bracket, a rod member having one end pivoted to one end of the bracket by a pin means, the rod member having a cover at said one end, the bracket and cover being U-shaped in transverse section of said pivot means, a portion of the cover overlying a portion of said one end of the bracket in all positions of the cover, said cover being journaled on bosses on said bracket, the bosses circumscribing a portion of the pin means, a second rod member pivotably connected by a cover to the opposite end of the bracket, said rod members being pivotable with respect to the bracket from a position where they are horizontally disposed and coaxial to a position wherein they are parallel to one another.

7. A safety hinge comprising a bracket, a rod member having one end pivoted to one end of the bracket by pin means, the rod member having a cover at said one end, said cover having a sleeve telescoped over and surrounding a portion of said rod member adjacent said one end, the bracket and cover being U-shaped in transverse section at said pivot means, a top wall of the cover overlying and being in sliding contact with a top wall of said one end of the bracket in all positions of the cover, said top walls of the cover and bracket being arcuate with a radius of curvature located at the longitudinal axis of the pin means, and said top walls extending for an arc of 90° about the longitudinal axis of the pin means.

8. A safety hinge in accordance with claim 7 including cooperating limit stops on said sleeve and rod member to limit the extent to which the rod member may enter the sleeve, and said sleeve being open at both ends.

9. A safety hinge in accordance with claim 7 wherein the width of the bracket in a central portion thereof is greater than the width of said one end of the bracket by an amount corresponding to the thickness of the side walls of the cover.

10. A safety hinge in accordance with claim 7 wherein said cover has a rear wall which extends across the side walls thereof, said sleeve projecting from one end of said rear wall and being open at both ends.

* * * * *